United States Patent
Jafarian et al.

(10) Patent No.: US 9,191,891 B2
(45) Date of Patent: Nov. 17, 2015

(54) SYSTEMS AND METHODS FOR LOW POWER WAKE-UP SIGNAL IMPLEMENTATION AND OPERATIONS FOR WLAN

(71) Applicant: QUALCOMM Incorporated, San Diego, CA (US)

(72) Inventors: Amin Jafarian, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/776,141

(22) Filed: Feb. 25, 2013

(65) Prior Publication Data

US 2014/0126442 A1 May 8, 2014

Related U.S. Application Data

(60) Provisional application No. 61/722,040, filed on Nov. 2, 2012.

(51) Int. Cl.
*H04W 52/02* (2009.01)

(52) U.S. Cl.
CPC ............ *H04W 52/0212* (2013.01); *Y02B 60/50* (2013.01)

(58) Field of Classification Search
USPC .................. 370/252, 282, 311, 389; 455/574, 455/127.1, 127.5, 343.2, 343.3, 343.5
See application file for complete search history.

(56) References Cited

U.S. PATENT DOCUMENTS

| | | | |
|---|---|---|---|
| 6,590,886 B1 | 7/2003 | Easton et al. | |
| 7,295,827 B2 | 11/2007 | Liu et al. | |
| 7,904,023 B2 | 3/2011 | Viitamaki et al. | |
| 8,055,313 B2 | 11/2011 | Behzad et al. | |
| 8,150,477 B2 | 4/2012 | Cho et al. | |
| 8,175,109 B2 | 5/2012 | Nogueira-Nine et al. | |
| 8,179,873 B2 | 5/2012 | Bonta et al. | |
| 8,203,985 B2 | 6/2012 | Gong et al. | |
| 8,223,680 B2 | 7/2012 | Twitchell, Jr. | |
| 8,249,644 B2 | 8/2012 | Taniuchi et al. | |
| 2001/0041551 A1* | 11/2001 | Rotzoll | 455/343 |

(Continued)

FOREIGN PATENT DOCUMENTS

EP 2160061 A2 3/2010

OTHER PUBLICATIONS

"Radio-Triggered Wake-ups with addressing Capabilities for Extremely Low Power Sensor Network Applications"; Ansari et al.; IEEE 19th International Symposium on Personal, Indoor and Mobile Radio Communications, PIMRC 2008.*

(Continued)

*Primary Examiner* — Benjamin H Elliott, IV
(74) *Attorney, Agent, or Firm* — Dang M. Vo

(57) ABSTRACT

Systems, methods, and devices for wireless communication are disclosed. In one implementation an apparatus for wireless communications is provided. The apparatus includes a receiver configured to receive a wake-up message that is a portion of a wake-up sequence. In certain implementations, the apparatus further includes a processing system operably coupled to the receiver and configured to wake the receiver for a period of time. The period of time can exceed at least a transmission period of the wake-up sequence plus a transmission period of the wake-up message. The apparatus can further include a transmitter configured to transmit a message acknowledging receipt of the wake-up message.

59 Claims, 11 Drawing Sheets

(56) References Cited

U.S. PATENT DOCUMENTS

| | | |
|---|---|---|
| 2003/0128684 A1 | 7/2003 | Hirsch et al. |
| 2004/0110508 A1 | 6/2004 | Haartsen |
| 2005/0122231 A1 | 6/2005 | Varaiya et al. |
| 2005/0130713 A1 | 6/2005 | Simpson et al. |
| 2006/0128349 A1 | 6/2006 | Yoon et al. |
| 2006/0229053 A1* | 10/2006 | Sivard ........................ 455/343.2 |
| 2007/0140157 A1 | 6/2007 | Fu et al. |
| 2007/0207765 A1* | 9/2007 | Nakahara et al. .......... 455/343.1 |
| 2007/0242634 A1 | 10/2007 | Calcev et al. |
| 2008/0014969 A1 | 1/2008 | Laroia et al. |
| 2008/0108318 A1 | 5/2008 | Min et al. |
| 2008/0130603 A1 | 6/2008 | Wentink et al. |
| 2009/0129306 A1 | 5/2009 | Twitchell et al. |
| 2009/0147837 A1* | 6/2009 | Lau ............................... 375/219 |
| 2010/0054214 A1* | 3/2010 | Igarashi et al. ............... 370/336 |
| 2010/0097969 A1* | 4/2010 | De Kimpe et al. ........... 370/311 |
| 2010/0099358 A1* | 4/2010 | Kumar et al. ................. 455/41.3 |
| 2010/0322126 A1 | 12/2010 | Krishnaswamy et al. |
| 2011/0140851 A1* | 6/2011 | Lee et al. ........................ 340/9.1 |
| 2011/0141969 A1 | 6/2011 | Sridhara et al. |
| 2011/0194471 A1 | 8/2011 | Kim et al. |
| 2011/0289320 A1* | 11/2011 | Twitchell et al. ............. 713/176 |
| 2011/0296058 A1 | 12/2011 | Cho et al. |
| 2011/0298435 A1 | 12/2011 | Homol et al. |
| 2012/0120859 A1 | 5/2012 | Stephens et al. |
| 2012/0171954 A1* | 7/2012 | Rudland et al. .............. 455/41.1 |
| 2012/0230337 A1 | 9/2012 | Lee et al. |
| 2013/0077610 A1 | 3/2013 | Amini et al. |
| 2013/0114583 A1 | 5/2013 | Park et al. |
| 2013/0238919 A1* | 9/2013 | Ponmudi et al. .............. 713/323 |
| 2013/0301441 A1* | 11/2013 | Russell et al. ................. 370/252 |
| 2013/0301569 A1* | 11/2013 | Wang et al. ................... 370/329 |
| 2014/0050133 A1 | 2/2014 | Jafarian et al. |
| 2014/0112224 A1 | 4/2014 | Jafarian |
| 2015/0036576 A1 | 2/2015 | Jafarian |

OTHER PUBLICATIONS

IEEE 802.11, IEEE Standard for Information technology—Telecommunications and information exchange between systems—Local and metropolitan area networks—Specific requirements; Part 11: Wireless LAN Medium Access Control (MAC) and Physical Layer (PHY), 2007.

IEEE 802.11; Part 11: Wireless LAN Medium Access Control (MAC) and Physical Layer (PHY) Specifications (Revision of IEEE STD 802.11-1999) (2007); pp. 1-914.

* cited by examiner

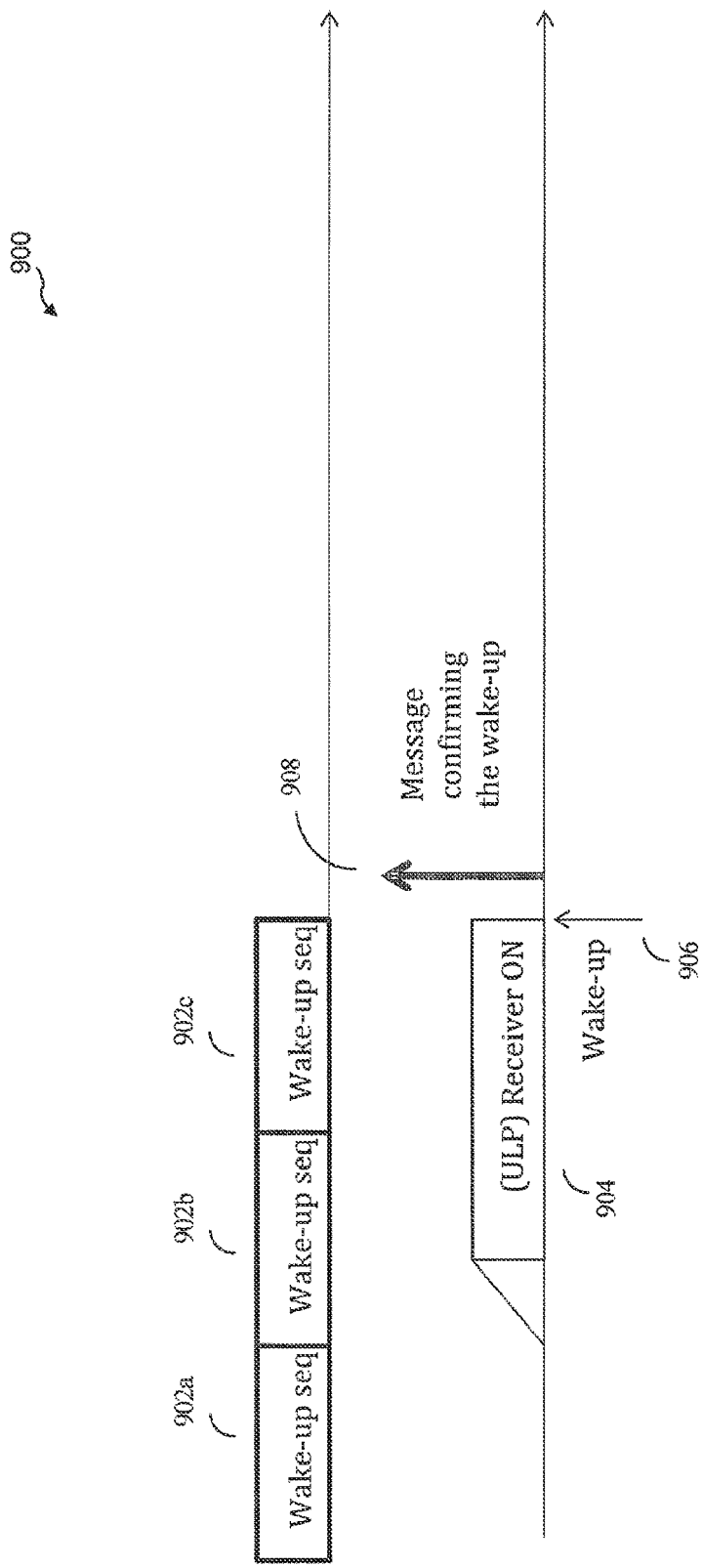

SYSTEMS AND METHODS FOR LOW POWER WAKE-UP SIGNAL IMPLEMENTATION AND OPERATIONS FOR WLAN

CROSS REFERENCE TO RELATED APPLICATIONS

This application claims priority to U.S. Provisional No. 61/722,040, titled "SYSTEMS AND METHODS FOR LOW POWER WAKE UP SIGNAL IMPLEMENTATION AND OPERATIONS FOR WLAN," filed Nov. 2, 2012, which is hereby incorporated by reference in its entirety.

BACKGROUND

1. Field

The present application relates generally to wireless communications, and more specifically to systems, methods, and devices to enable wireless communication. Certain implementations herein relate to low power wake-up signals and operations for WLAN.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and dynamic connectivity may be advantageous, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some implementations may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several implementations, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One implementation of the disclosure provides an apparatus for wireless communications. The apparatus includes a receiver. The apparatus further includes a processing system configured to activate the receiver for a period of time. The period of time exceeding or equaling at least a transmission period of a wake-up sequence that includes a wake-up message plus a transmission period of the wake-up message. The receiver is configured to receive the wake-up message during the period of time. The apparatus further includes a transmitter configured to transmit a message acknowledging receipt of the wake-up message.

Another implementation of the disclosure provides an apparatus for wireless communications. The apparatus includes a processing system configured to generate a plurality of wake-up sequences. Each wake-up sequence comprises at least one wake-up message. The apparatus further includes a transmitter configured to transmit the plurality of wake-up sequences to wake-up at least one station.

Another implementation of the disclosure provides an implementation of a method of wireless communication. The method includes activating a receiver for a period of time. The period of time exceeding or equaling at least a transmission period of a wake-up sequence that includes a wake-up message plus a transmission period of the wake-up message. The receiver is configured to receive the wake-up message during the period of time. The method further includes transmitting a message acknowledging receipt of the wake-up message.

Another implementation of the disclosure provides an implementation of a method for wirelessly activating a wireless station. The method includes generating a plurality of wake-up sequences and transmitting the plurality of wake-up sequences. Each of the plurality of wake-up sequences includes at least one wake-up message.

Yet another implementation of the disclosure provides an apparatus for wireless communications. The apparatus includes means for activating a receiver for a period of time. The period of time exceeding or equaling or exceeding at least a transmission period of a wake-up sequence that includes a wake-up message plus a transmission period of the wake-up message. The receiver is configured to receive the wake-up message during the period of time. The apparatus further includes means for transmitting a message acknowledging receipt of the wake-up message.

Yet another implementation of the disclosure provides an apparatus for wireless communications. The apparatus includes means for generating a plurality of wake-up sequences and means for transmitting the generated wake-up sequences. Each of the plurality of wake-up sequences includes at least one wake-up message.

Another implementation of the disclosure provides a computer program product comprising a computer readable storage medium encoded thereon with instructions that when executed cause an apparatus to perform a method. The method includes activating a receiver for a period of time, the period of time exceeding or equaling at least a transmission period of a wake-up sequence that includes a wake-up message plus a transmission period of the wake-up message. The receiver is configured to receive the wake-up message during the period of time. The method further includes transmitting a message acknowledging receipt of the wake-up message.

Another implementation of the disclosure provides a computer program product comprising a computer readable storage medium encoded thereon with instructions that when executed cause an apparatus to perform a method. The method includes generating a plurality of wake-up sequences, each wake-up sequence comprising at least one wake-up message. The method further includes transmitting the plurality of wake-up sequences.

Another implementation of the disclosure provides a mobile station. The mobile station includes at least one antenna and a receiver. The mobile station further includes a processing system configured to activate the receiver for a period of time, the period of time exceeding or equaling at least a transmission period of a wake-up sequence that includes a wake-up message plus a transmission period of the wake-up message. The receiver is configured to receive, via the at least one antenna, the wake-up message during the period of time. The method further includes a transmitter configured to transmit, via the at least one antenna, a message acknowledging receipt of the wake-up message.

Another implementation of the disclosure provides a wireless node for wireless communications. The apparatus includes at least one antenna and a processing system configured to generate a plurality of wake-up sequences. Each wake-up sequence comprising at least one wake-up message. The apparatus further including a transmitter configured to transmit, via the at least one antenna, the plurality of wake-up sequences to wake-up at least one station.

BRIEF DESCRIPTION OF THE DRAWINGS

FIG. 9 shows additional exemplary signal transmissions for transmitting and receiving a low power wake-up signal, in accordance with an exemplary implementation of the invention.

DETAILED DESCRIPTION

Figure 1:
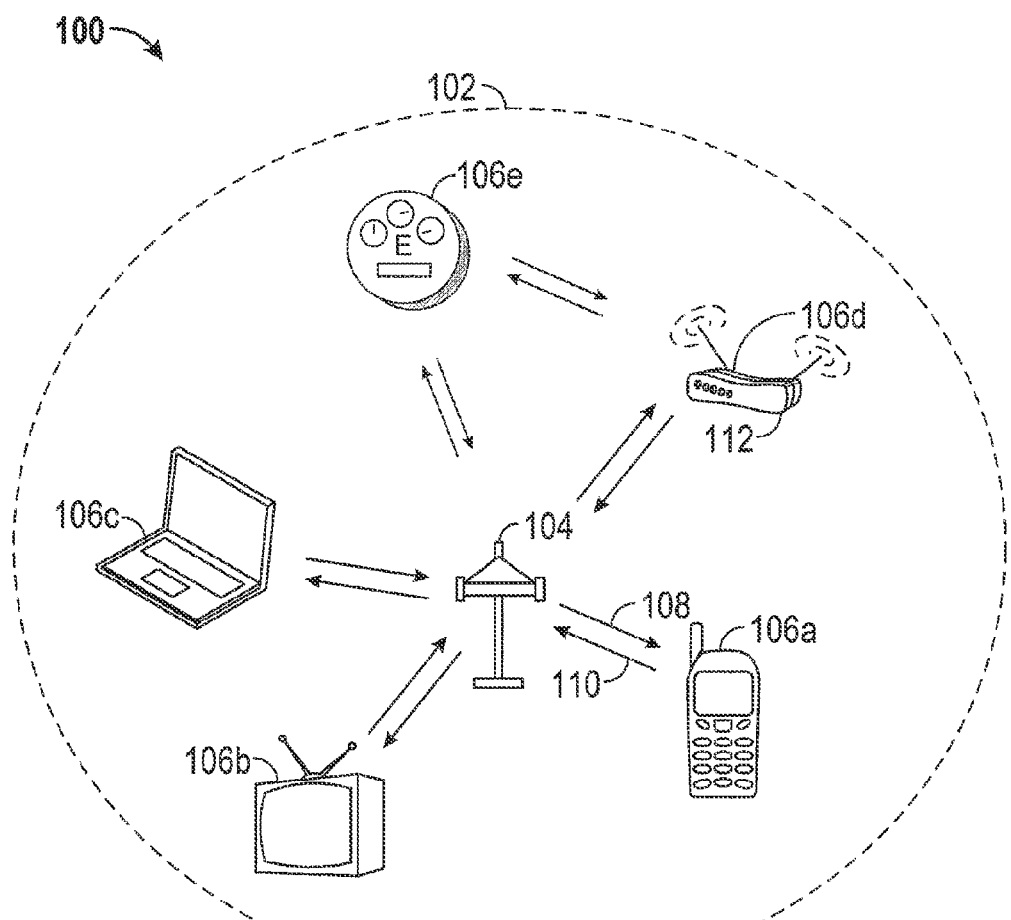
FIG. 1 illustrates an example of a wireless communication system in which implementations of the present disclosure may be employed.

Various implementations of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these implementations are provided so that this disclosure will be thorough and complete, and will fully convey the scope of the disclosure to those skilled in the art. Based on the teachings herein one skilled in the art should appreciate that the scope of the disclosure is intended to cover any implementation of the novel systems, apparatuses, and methods disclosed herein, whether implemented independently of or combined with any other implementation of the invention. For example, an apparatus may be implemented or a method may be practiced using any number of the implementations set forth herein. In addition, the scope of the invention is intended to cover such an apparatus or method which is practiced using other structure, functionality, or structure and functionality in addition to or other than the various implementations of the invention set forth herein. It should be understood that any implementation disclosed herein may be embodied by one or more elements of a claim.

Although particular implementations are described herein, many variations and permutations of these implementations fall within the scope of the disclosure. Although some benefits and advantages of the preferred implementations are mentioned, the scope of the disclosure is not intended to be limited to particular benefits, uses, or objectives. Rather, implementations of the disclosure are intended to be broadly applicable to different wireless technologies, system configurations, networks, and transmission protocols, some of which are illustrated by way of example in the figures and in the following description of the preferred implementations. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various implementations described herein may apply to any communication standard, such as Wi-Fi or, more generally, any member of the IEEE 802.11 family of wireless protocols. For example, the various implementations described herein may interoperate with or be used as part of the IEEE 802.11ah protocol, which may use sub-1 GHz bands. However, it should be appreciated that a wide variety of other bands and wireless protocols are contemplated by the implementations described herein.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations described herein may be used for sensors, metering, and smart grid networks. Advantageously, implementations of certain implementations may include wireless devices that may consume less power than devices implementing other wireless protocols, and/or may be used to transmit wireless signals across a relatively long range, for example about one kilometer or longer. These devices may be configured to operate on power provided by energy storage devices and may be configured to operate without replacing the energy storage device for long periods of time (e.g., months or years).

The devices described herein may further comprise Multiple Input Multiple Output (MIMO) technology. A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels or streams, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more implementations taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices described herein, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Wireless devices consume power when transmitting or receiving signals. Certain of the devices described herein operate in a plurality of states with differing capabilities and different levels of power consumption. For example, receivers consume more power in an awake state, during which time receiver circuits are activated and may receive incoming signals, or in a doze state during which time circuits are not activated and don't receive incoming signals. Reducing the amount of time that receivers are in an awake state and waiting to receive incoming signals reduces power consumption.

Wireless devices employ various power management modes to manage operational states. These power management modes include "Active", where the device is always in an Awake state, "Normal Power Save", where the device can be either in an Awake state or a Doze state, or "Power save with ultra low power" (PS-ULP), where the device can be in Awake state or a Low Power state which may save more power than when the device is in a Doze state. While the implementations described herein that relate to using ultra low power (ULP) messages that may be received by a low power receiver (that is, a second receiver in a device) may be applicable to many different power modes of operating a wireless device, for clarity of the disclosure, the examples of certain implementations described herein generally relate to using a Normal Power Save mode.

One way to reduce the time that a receiver STA is awake is to transition the receiver to doze state for most of the time, except for those short intervals of time agreed with the transmitter when signals may be sent from the transmitter to the receiver. This is neither flexible nor efficient because in typical applications, the traffic pattern is unpredictable. The agreed awake time may not match the traffic pattern, so some awake times may not correspond to transmit times. There may also be times when transmitted signals are not received because they are transmitted outside of the agreed awake time.

A more flexible and effective approach is for the receiver to doze until a trigger event triggers the receiver to transition to awaken. In some implementations, the trigger event is generated when a circuit receives a wake-up wireless signal. Power consumption is reduced in cases where the wake-up signal is configured so that circuitry that receives the wake-up signal is a simple and low power receiver. The low power receiver (sometimes referred to as a "wake-up receiver") is configured to consume less energy than the regular data receiver to reduce overall power consumption of the wireless device.

In one implementation, the STA's regular data receiver is in doze state. A transmitter (e.g., of an AP or other STA) wirelessly sends a signal to the STA's low power receiver. The STA's low power receiver receives the wireless signal and performs some action. For example, the action may be to wake-up the STA's regular data receiver (either immediately or at a specified time or time delay) to an awake state such that the STA's regular receiver can receive data. In some cases, the STA then sends a message to inform an AP or another STA that it is awake. Then, an AP or STA may send data to the STA's regular receiver, and it is received and processed by the STA.

For some devices, the wireless signal received by the low power receiver (sometimes referred to as an "ultra low power receiver" or "radio frequency (RF) wake-up circuit") may be a wake-up packet, or an ultra low power (ULP) wake-up message (wake-up message). In some implementations in this disclosure, protocols are identified for using such signals or messages to conserve power. Implementations of the content and duration of the wake-up sequence are also disclosed.

There may be multiple formats of the ULP message. Different formats may be suitable for different scenarios.

In such implementations, the format, content, and definition of the transmitted and received ULP messages that are received by the low power receiver of a wireless device are known by the transmitting and receiving wireless devices so that the receiver can identify and parse incoming ULP messages. In some implementations, after identifying and parsing the incoming ULP message, the AP or other STA may send a ULP message at certain target times and/or time intervals. In some implementations, the receiving STA can use a simple and low power receiver circuit designed to receive certain ULP messages of expected configurations and content.

It may also be preferred to reduce the amount of time that the low power receiver is in an awake state and waiting to receive the ULP message. Thus, the receiving STAs may be further configured to further reduce power consumption by employing a power saving scheme that places the wake-up circuit or activation circuit in different operational states, such as ultra low power, doze, or awake. In some cases, these states may correspond to the states employed by the STA's regular data receivers and transceivers. In certain implementations, the low power receiver cycles between an awake state and a doze state in accordance with a duty cycle. In some implementations, the awake state of the duty cycle begins at a defined time and lasts for a period of time. In some implementations, the defined time is predetermined. In some implementations, the defined time is dynamically determined. However, the low power receiver may be unable to receive the wake-up message when in the doze state.

This disclosure identifies a protocol, including a wake-up sequence for STA's to wake-up another STA using ULP messages. This disclosure describes potential timing of the ULP messages and related setup signaling. This disclosure also describes state transitions of the STA depending on some combination of initial state, power saving mode (for example, PS-ULP mode), and signals received or transmitted.

For some implementations, power is conserved by maximizing the time analog and digital circuits are in an off or sleep state. For some implementations, different circuits within the wireless device may be in different states. For example, the regular data receiver may be in the doze state, while the ULP receiver is awake to receive ULP messages.

For some implementations, a wake-up circuit or activation circuit selectively receives a particular RF signal structure. When detected, the wake-up circuit activates the STA's regular data receivers and transceivers. These regular receivers may contain analog and/or digital circuitry.

In some implementations, state transitions are not instantaneous. For example, when the transceiver is powered on, it may take several hundred microseconds to wake-up a primary receiver, largely due to phase locked loop (PLL) convergence time, loading of calibration coefficients, and time to load registers. When the transceiver is fully powered off, wake-up time could take several milliseconds. In some implementations, sufficient time is allocated and medium reserved to allow for state transition time.

In some implementations, the low-power receiver is a separate module from the wireless device's primary transceiver. In other implementations, they are in the same module.

For some implementations, the STA operates in Active mode, with a single Awake state. For other implementations, the STA operates in regular PS mode, with two operational states: Awake and Doze.

For some implementations, the STA operates in Power Save-Ultra Low Power (PS-ULP) mode. For some implementations of STAs operating in PS-ULP mode, the STA may transition among three operational states: Awake, Doze, or ULP. Transitions from Doze state to awake state, or Awake state to Doze state may use the existing PS mode transition conventions. When transitioning from Doze state to Awake state, the STA may send a PS-Poll or a trigger frame to an AP and indicate it's ready to receive data. When transitioning from awake state to Doze state, the AP indicates that the STA may go to sleep. In some implementations, the AP sets a More Data parameter to false. In other implementations, the AP sets an End of Service Parameter to true. Similar mechanisms may be employed in other implementations. This disclosure describes various implementations associated with transitions from doze state to ULP state, from ULP state to awake state, from ULP state to doze state, and from awake state to ULP state.

FIG. 1 shows an exemplary wireless communication system 100 in which aspects of the present disclosure may be employed. The wireless communication system 100 may operate pursuant to a wireless standard, for example an 802.11 standard. The wireless communication system 100 may or may not include an AP 104. In wireless communication systems 100 that include the AP 104, the AP 104 can communicate with the STAs 106. In some implementations, the STAs 106 communicate directly with other STAs 106.

In some implementations, the STA 106 may be configured as a relay 112. The relay 112 relays communications between the STA 106 and the AP 104. It may be advantageous for the STA 106 to operate as the relay 112 when the STA 106 is out of range or otherwise having difficulty communicating with the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal, via a communication link such as the downlink 108, to other nodes STAs 106 of the system 100, which may help the other nodes STAs 106 to synchronize their timing with the AP 104, or which may provide other information or functionality. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list. Thus, a beacon may include information both common (e.g. shared) amongst several devices, and information specific to a given device.

The STA 106 and/or AP 104 may transmit ULP messages to other STAs 106 of the system 100, which may wake-up the STA 106 to receive subsequent data packets, or which may provide other information or functionality.

Such ULP messages may be transmitted periodically. In one aspect, the messages may include, but is not limited to, such information as the time to wake-up the receiver, the time to put a receiver to sleep, or duration information, timestamp information to set a common clock, a peer-to-peer network identifier, a device identifier, capability information, a page superframe duration, transmission direction information, and/or reception direction information, some of which are described in additional detail below. Thus, a message may include information both common (e.g. shared) amongst several devices, and information specific to a given device.

In certain wireless communication systems 100, an STA 106 may transmit a ULP message to another STA 106 that is in a power save mode, the ULP message indicating whether or not there is data buffered for the STA 106. The receiving STA 106 may use this information to determine when to transition to an awake state or a doze state. For example, if an STA 106 determines it is not being contacted, it may enter a doze state. Alternatively, if the STA 106 determines it may be contacted, the STA 106 may enter an awake state for a certain period of time to receive the ULP message and further determine when to be in an awake state based on the ULP message. Further, the STA 106 may stay in the awake state for a certain period of time after receiving the ULP message. In another example, the STA 106 may be configured to function in other ways when receiving a ULP message or not receiving a ULP message that are consistent with this disclosure.

Figure 2:
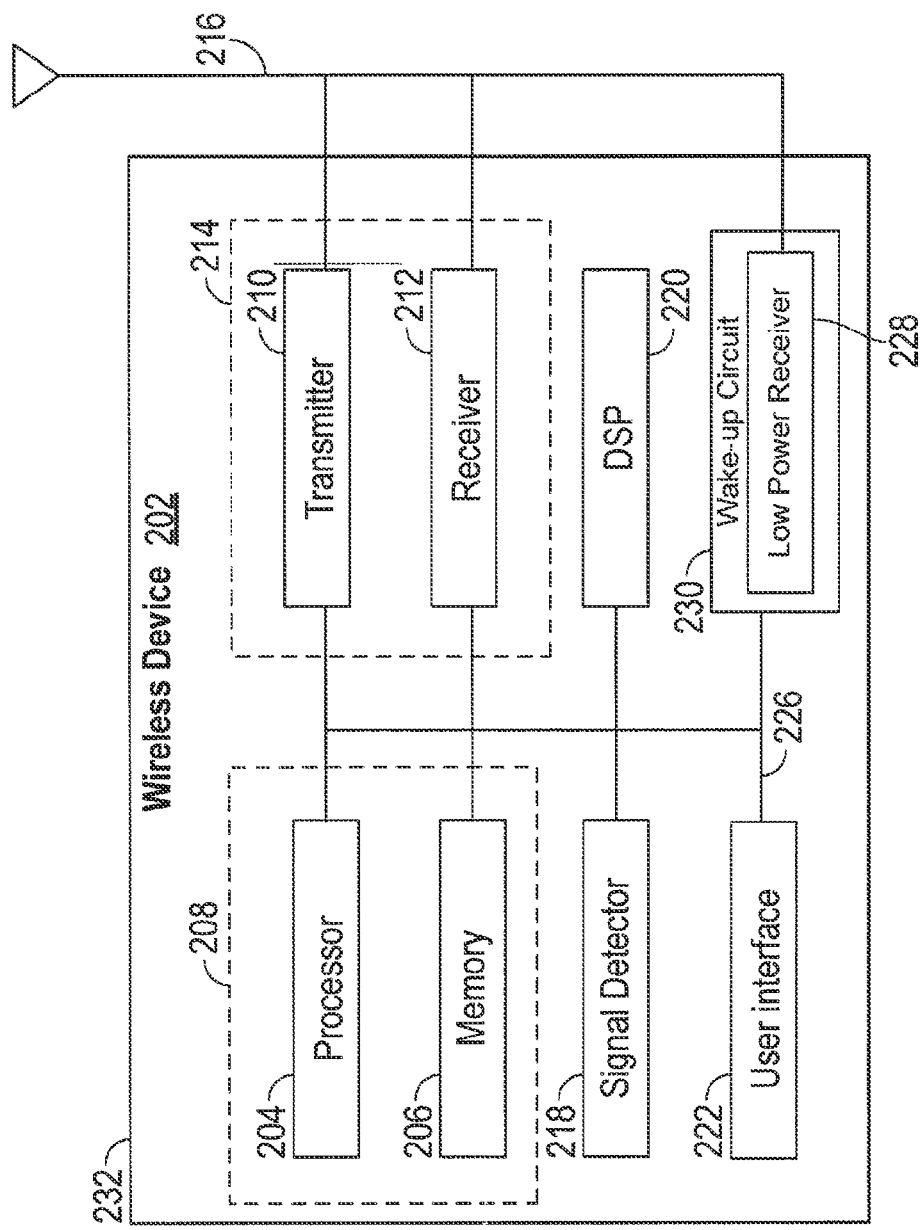
FIG. 2 shows a functional block diagram of an exemplary wireless device that may be employed within the wireless communication system of FIG. 1, in accordance with an exemplary implementation of the invention.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, one of the STAs 106. For ease of explanation, the term "wake-up" is used to mean when a device, such as STA 106, enters an operational state and can perform its intended function, for example, sending and receiving data. The term "activate" is used to mean when a component of the STA 106, such as the low power receiver 228, enters an operational state while another component of the STA 106, such as the transceiver 214, is not in an operational state.

The wireless device 202 may include a processing system 208 comprising a processor 204 and memory 206. In some implementations, the processing system 208 may further comprise a signal detector 218 and/or a DSP 220. The processor 204 controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system 208 implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In some cases, a means for generating may include the processing system 208.

In some cases, a means for generating may include the processor 204. In some cases, a means for encoding may include the processing system 208. In some cases, a means for encoding may include the processor 204.

The processing system 208 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 208 to perform the various functions described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The wireless device 202 may also include a housing 232 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

In some cases, a means for transmitting may include the transmitter 210. In some cases, a means for transmitting may include the transceiver 214. In some cases, a means for sending may include the transmitter 210. In some cases, a means for sending may include the transceiver 214. In some cases, a means for receiving may include the receiver 212. In some cases, a means for receiving may include the transceiver 214.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some implementations, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit or activation circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. In some cases, a means for receiving may include the low power receiver 228.

In one aspect, the low power receiver 228 may be configured to receive signals using a null data packet (NDP) paging frame. The structure of an exemplary NDP paging frame can include a P-ID field, DI field, and/or an APDI/PAID field. The P-ID field is an identifier of the paged station. The DI field is a direction identifier. In certain implementations, if the NDP paging frame is sent by a non-AP station to an AP, then the DI field shall be set to 1. If the NDP paging frame is sent by an AP, then the DI field should be set to 0. The APDI/PAID field is set to either APDI or PAID, depending on the value of the DI field. If the DI field is set to 1, the APDI/PAID field is set to PAID (Transmitter Partial AID), which is set to the PAID of the transmitter non-AP station. If the DI field is set to 0, the APDI/PAID field is set to APDI. The paging frame may also include one or more reserved fields.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or a STA 106, and may be used to transmit and/or receive communications. That is, either AP 104 or STA 106 may serve as transmitter or receiver devices. Certain aspects contemplate signal detector 218 being used by software running on memory 206 and processor 204 to detect the presence of a transmitter or receiver.

Figure 3:
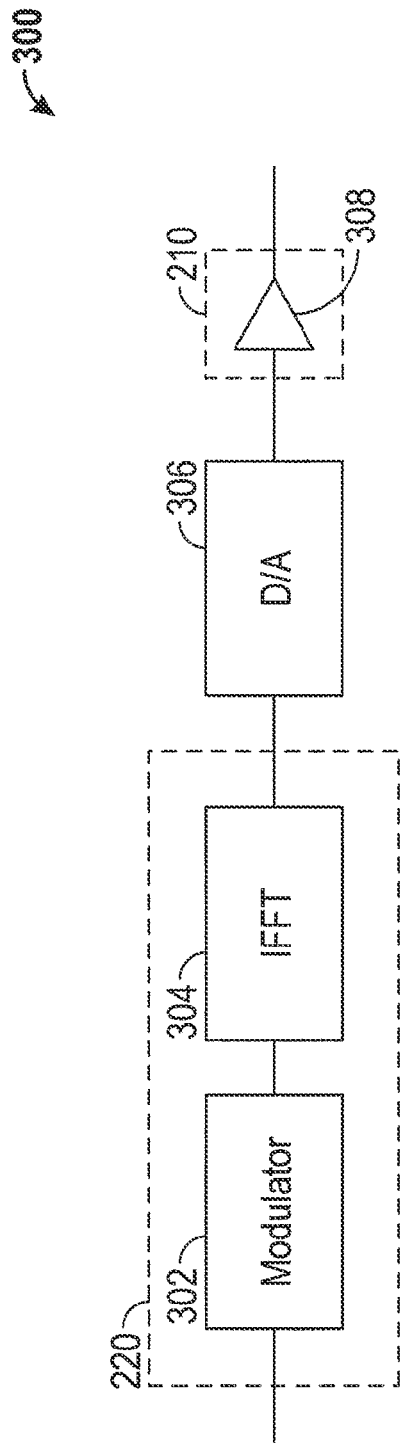
FIG. 3 shows a functional block diagram of exemplary components that may be utilized in the wireless device of FIG. 2 to transmit wireless communications, in accordance with an exemplary implementation of the invention.

FIG. 3 illustrates various components that may be used to transmit wireless communications, such as OFDM communications.

The wireless device 300 of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 300 may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 804 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 804 may be referred to as the size of the transform module 804. It should be appreciated that the transform module 804 may be configured to operate according to additional modes where 128 points, 256 points, 512 points, and 1024 points are used, and the like.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202 (e.g., see description above with reference to FIG. 2).

As discussed above, the DSP 220 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 300 may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets or data units in a wireless signal based on the analog signal. The data units may be generated using the processor 204 (FIG. 2) and/or the DSP 220, for example using the modulator 302 and the transform module 304 as discussed above. Data units that may be generated and transmitted as discussed above are described in additional detail below.

Figure 4:
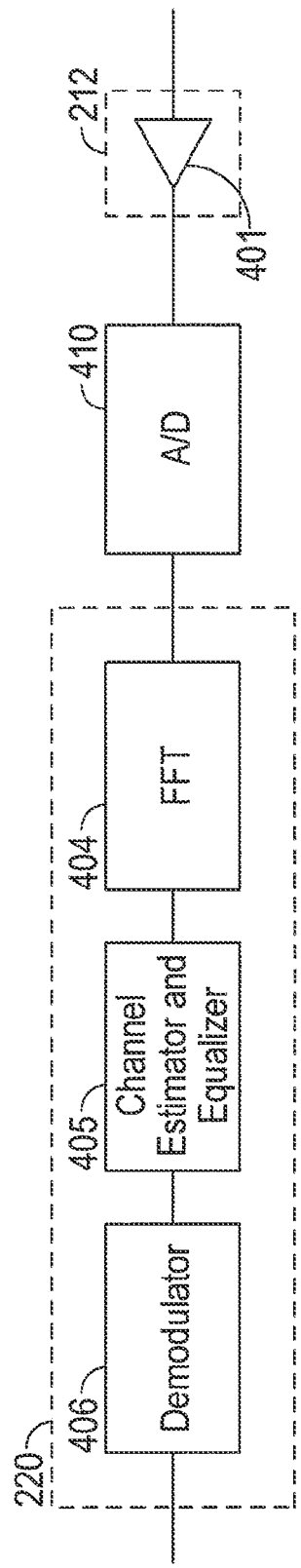
FIG. 4 shows a functional block diagram of exemplary components that may be utilized in the wireless device of FIG. 2 to receive wireless communications, in accordance with an exemplary implementation of the invention.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 212 of wireless device 400 is configured to receive one or more packets or data units in a wireless signal. Data units that may be received and decoded or otherwise processed as discussed below.

In the aspect illustrated in FIG. 4, the receiver 212 includes a receive amplifier 401. The receive amplifier 401 may be configured to amplify the wireless signal received by the receiver 412. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 400 may comprise an analog to digital converter 410 configured to convert the amplified wireless signal from the receiver 212 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 400. In some aspects, the analog to digital converter 410 is implemented in the transceiver 214 (FIG. 2) or in a data receive processor.

The wireless device 400 may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 400 may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 400 may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 906 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 300 shown in FIG. 3 is an example of a single transmit chain to be transmitted over an antenna. The wireless device 400 shown in FIG. 4 is an example of a single receive chain to be received over an antenna. In some implementations, the wireless device 300 or 400 may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

In the STA 106, a significant source of power consumption may be due to the long time spent by the STA 106 in receive mode, either during packet reception and especially during the time a receiver is on and waiting to receive a packet. In battery operated STAs, transmit power may be comparable to receive power, but receive time may be much longer than transmit time. Particularly when operating using a battery, it is desirable to reduce the awake time of STAs 106 to reduce power consumption. One way to reduce the awake time of the STA 106 is for the STA 106 to operate in the receive mode for short intervals of time. In this case the transmitter 210 and receiver 212 may use the same on/off cycle. However, the use of the same on/off cycle may not be flexible or efficient. For example, in typical applications, the traffic pattern is not predictable. In addition, the agreed awake time based on the on/off cycle may not match the traffic pattern. In this case the STA 106 may be awake during times when there is limited traffic. In addition, the traffic may come at times when the STA 106 is in an off state based on the on/off cycle. In this case the STA 106 may miss packets intended for the STA 106 or their reception is delayed until the STA 106 wakes up.

In an implementation, the STA 106 comprises the low power receiver 228. The STA 106 may be configured to communicate with the AP 104. In this case, there may be an association (e.g., registration) procedure where certain information is exchanged between the STA 106 and the AP 104 to agree on future communication parameters and activities. In another implementation, the STA 106 communicates with other STAs that are not associated with each other.

In one implementation, the low power receiver 228 may remain on continuously while the STA 106 is in operation. In another implementation, the state of the low power "wake-up" receiver 228 changes between awake and sleep states according to an on/off duty cycle. The duty cycle can be defined by a given schedule to further reduce energy consumption. For example, the processor 204 or a controller may regulate the schedule. Furthermore, the processor 204 may be configured to control when the low power receiver 228 listens for a wake-up signal. For example, the processor 204 can select a schedule that varies the duration and time period (e.g., awake periods for example during business hours as compared to other sleep periods).

According to an implementation, to maximize sleep, the transceiver 214, analog and digital, may be configured to be off (e.g., powered down). During this time, only the wake-up circuit 230 is powered. The low power receiver 228 of the wake-up circuit 230 listens for a particular RF signal structure. When detected, the wake-up circuit 230 turns on or otherwise activates the transceiver 214, analog and digital. In some cases, the transceiver 214 and modem may take ~100-200 us to wake-up (assuming transceiver 214 stays powered). The wake-up time may be a function of PLL convergence time, loading of calibration coefficients, and other register loading. In some cases, the wake-up time may be ~2 ms if the transceiver 214 is fully powered off as well. Thus, in one implementation, the wake-up packet may reserve a wireless medium for a time period to allow the transceiver 214 to wake-up and start receiving data. The wake-up packet may include the special RF signal structure.

In some implementations, the STA 106 is not associated with other STAs. For examples, the STA 106 and other STAs may not be associated with the AP 104 and their interaction with each other is based on events and temporary proximity (e.g., asynchronous operation). For example, in a building, a battery operated small sensor is placed in each room. Each sensor may be configured as the STA 106 in a receiver mode. As described above, the transceiver 214 of the STA 106 is normally off, to save power. A smartphone, configured as the STA 106, enters the building and wants to interact with the sensor STA 106, e.g., to discover its location or issue a command. The smartphone STA 106 issues a low power wake-up signal. A neighboring sensor STAs 106 may be configured to detect the low power wake-up signal using the wake-up circuit 230 and activate or turn on the transceiver 214 (radio). Either the sensor STA 106 proactively sends a packet indicating the location, or the sensor STA 106 waits for reception of a packet from the smartphone STA 106 to determine which action to take.

The wake-up circuit 230 may be configured to operate according to several modes. For example, in a first mode the low power receiver 228 is always on and waiting to receive a wake-up packet. When in the first mode, the response time is reduced but results in higher power consumption. In a second mode, the low power wake-up receiver 228 is not always on and operates according to a wake-up duty cycle. The wake-up duty cycle may be adapted to tolerate interaction delay. In some cases, the wake-up signal is sent multiple times so as to reach the receiver when the receiver is in the ON state.

In other implementations the STA 106 may be associated with an AP 104. As such, in one implementation, the STA 106 is able to interact with the AP 104 and exploit cooperation with the AP 104 (e.g., synchronous operation is possible). For example, when the STA 106 and the AP 104 are associated there may be ways to enhance existing power save modes. For example, in a power save mode, the STA 106 may wake-up to receive beacons. The beacon indicates if the STA 106 should stay awake to receive downlink data (e.g., paged). In addition, there may be an enhancement with the low power wake-up receiver 228 where the AP 104 sends a low power wake-up signal before the beacon, indicating whether the STA 106 is (or may) be paged in the beacon. If the STA 106 is not paged, the STA 106 turns on the transceiver 214 to receive the beacon to save power. In these cases, the low power receiver 228 may be on at least some time before the beacon, to receive the wake-up signal.

In addition, by using association there may be benefits based on traffic assumptions. For example as there may be a low probability of downlink data (in this case the STA 106 may go to sleep most of the times after the low power wake-up signal). In addition, there may be benefits to association when the STA 106 is asleep for a long period of time and when there are large clock drifts. The low power wake-up signal indicates to the STA 106 when a beacon is transmitted. The STA 106 need not turn on its transceiver 214 until that time.

The RF low power wake-up signal may be transmitted on the same channel as other data signals. For example, the low power wake-up signal may be transmitted on the same channel as Wi-Fi data signals. In this way, the transmission of the low power wake-up signal coexists with other transmitted data. In one implementation, certain considerations are taken into account to provide this coexistence. For example, a wake-up signal may have narrower bandwidth than a Wi-Fi signal. In addition, there may be regulatory limitations on how narrow the band for the wake-up signal can be and still achieve acceptable levels of sensitivity/range. The STAs 106 may be power constrained and employ a low transmit power. As such, for STAs 106 in an associated state (e.g., likely to be close to the AP 104), the downlink link budget may be several dB better than the uplink one. Furthermore, the sensitivity of the low power receiver 228 may be less than the regular receiver by up to ~20 dB. For non-associated STAs running proximity applications (e.g. location tags, non-associated scenario), the lower sensitivity may be acceptable because range is less important to run those types of applications.

Figure 5A:
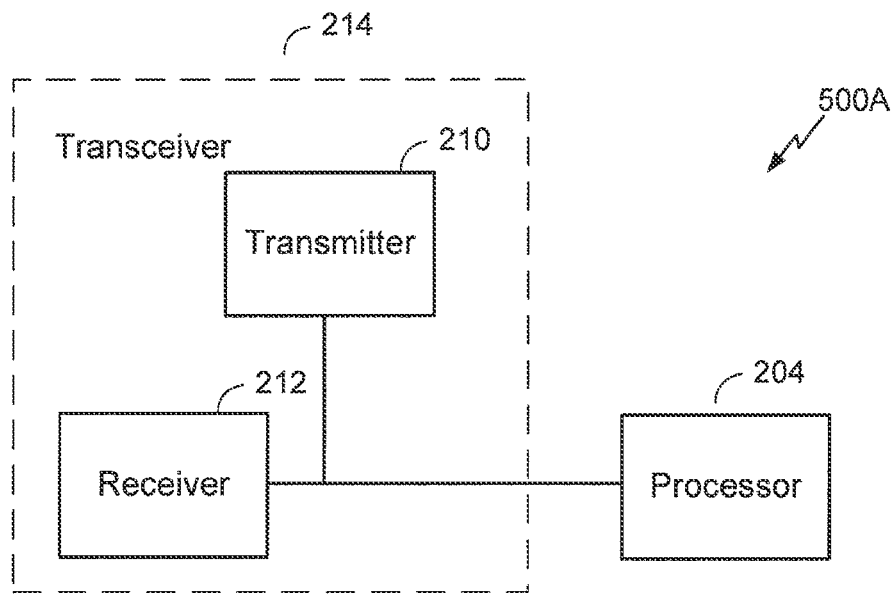
FIG. 5A is a functional block diagram of another exemplary wireless device that may be employed within the wireless communication system of FIG. 1.

FIG. 5A is a functional block diagram of another exemplary wireless device 500A that may be employed within the wireless communication system 100. The wireless device 500A includes the transmitter 210, the receiver 212, and the processor 204 from FIG. 2. Those skilled in the art will appreciate that the wireless device 500A may have more or less components than the wireless devices shown in FIG. 2.

Figure 5B:
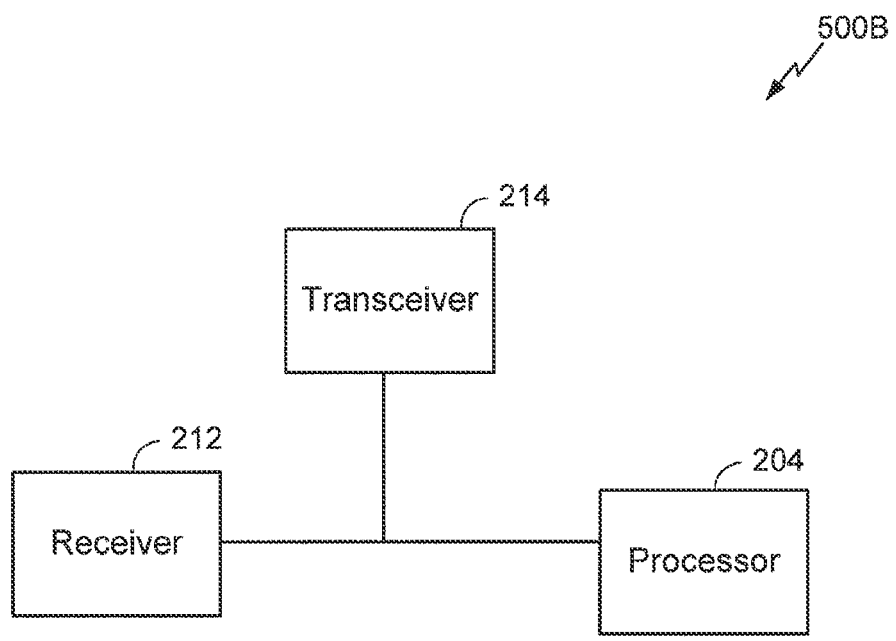
FIG. 5B is a functional block diagram of another exemplary wireless device that may be employed within the wireless communication system of FIG. 1.

FIG. 5B is a functional block diagram of another exemplary wireless device 500B that may be employed within the wireless communication system 100. The wireless device 500B includes the transceiver 214, the receiver 212, and the processor 204 from FIG. 2. Those skilled in the art will appreciate that the wireless device 500B may have more or less components than the wireless devices shown in FIG. 2.

Figure 6:
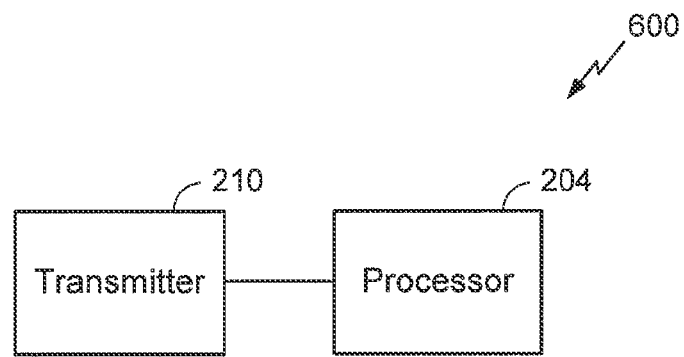
FIG. 6 is a functional block diagram of another exemplary wireless device that may be employed within the wireless communication system of FIG. 1.

FIG. 6 is a functional block diagram of another exemplary wireless device 600 that may be employed within the wireless communication system 100. The wireless device 600 includes the transmitter 201 and the processor 204 from FIG. 2. Those skilled in the art will appreciate that the wireless device 600 may have more or less components than the wireless devices shown in FIG. 2.

Figure 7A:
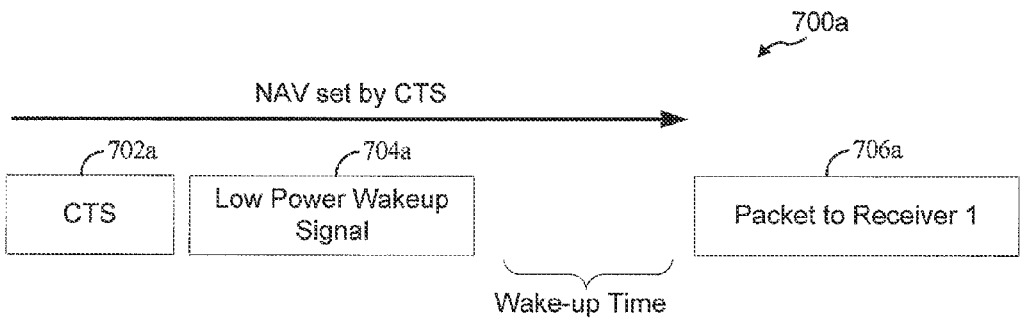
FIGS. 7A and 7B show additional exemplary signal receptions for receiving a low power wake-up signal, in accordance with an exemplary implementation of the invention.

FIG. 7A shows a group of exemplary signal transmissions that are transmitted by an STA 106 to wake-up another STA 106. Initially, the STA 106 sends a clear-to-send (CTS) frame 702a over the wireless medium. Any STA 106 of FIG. 1 that is able to receive and decode the CTS frame 702a may set its network allocation vector (NAV) and defer access to the channel for the duration of the low power wake-up signal 704a and optionally defer access during a subsequent wake-up time period. After the CTS frame 702a is sent, the STA 106 sends a low power wake-up signal 704a. The low power receiver 228 of a corresponding STA 106 may receive and detect the low power wake-up signal 704a. The receiving STA 106 thereafter activates its transceiver 214. The STA 106 transmitting the low power wake-up signal 704a thereafter transmits a packet 706a to the STA 106. In addition, the STA 106 transmitting the low power wake-up signal 704a may transmit a null frame during the wake-up time as described above.

Figure 7B:
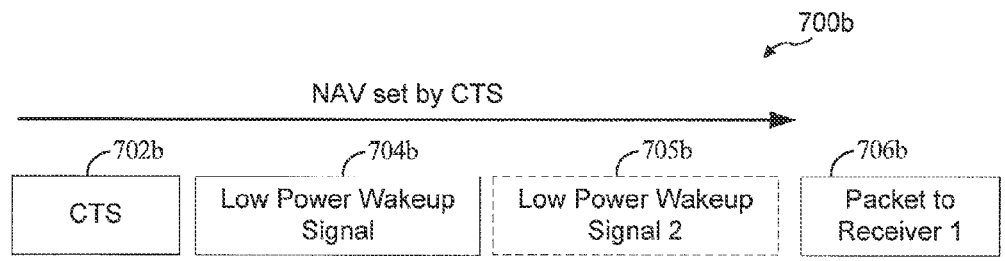

FIG. 7B shows another group of exemplary signal transmissions that are transmitted by an STA 106 to wake-up another STA 106. The frames are the same as describe in connection with FIG. 7A, except that the STA 106 transmits two low power wake-up signals 704b and 705b. In this case, the CTS 702b may indicate to the STAs 106 to set the NAV for the duration of both low power wake-up signals 704b and 705b. Thereafter, packets (for example, packet 706b) are sent to the corresponding STA 106.

In non-association scenarios, the STAs 106a, 106b, 106c and 106d are not associated with the AP 104. Their interaction with other STAs 106 may be based on events and temporary proximity. In some implementations, the low power receiver 228 is always on waiting to receive a wake-up sequence. This may ensure that the receiver 212 has a fast response to any incoming data traffic. However, the receiver 228 may consume excessive power.

In some other implementations, the low power receiver 228 cycles between doze and awake states per a duty cycle. In some implementations, the STA 106 sends the wake-up signal multiple times to synchronize with a time the receiver 228 is in the awake state. If the transmitting STA 106 is aware that the receiving STA 106 will be awake at a predetermined time, for example at a multiple of a given timing synchronization function (TSF) value, the STA 106 may not need to re-transmit the wake-up signal to the receiving STA 106.

In one implementation, the STA 106 operates in 3 modes: (1) Active mode; (2) PS (power saving) mode or regular PS mode, i.e. either awake or doze; and (3) PS-ULP mode, i.e. either awake, doze or ULP. When the STA 106 is in the PS-ULP mode, the STA 106 can be in one of 3 states: (1) awake, (2) ULP and (3) doze, or one of 4 states: (1) awake, (2) doze, (3) ULP-awake, and (4) ULP-doze.

The STA 106 may know the state of the receiving STA 106 before the transmitting STA 106 sends data to the receiving STA 106. If the receiving STA 106 is awake, a normal packet can be sent. If the receiving STA 106 is in a doze state, the packet will not be received by the STA 106. If the receiving STA 106 is in the ULP/ULP-awake state, the sending STA 106 wakes up the receiving STA 106 before transmitting data. In some implementations, it is assumed that the sender STA 106 knows the receiving STA 106 is ULP capable.

In some other implementations, the sender STA 106 sends a message to determine if there is a ULP capable STA 106 in the neighborhood. In some other implementations, the sender STA 106 knows baseline operation parameters for the receiving STA 106. These baseline operation parameters may be programmed by the user and/or manufacturer of the STA 106.

In implementations where two STAs 106 are not paired, one STA 106 may know whether the other STA 106 supports ULP mode. For example, the STA 106 may know a ULP wake-up duty cycle of a peer STA 106 because the ULP wake-up duty cycle is a default setting or is configured by a user. In implementations where two STAs 106 are not paired, one STA 106 may know the address of the other STA 106. In some implementations, the address may be a broadcast address. In some other implementations, this address is defined in a specification, for example, as a broadcast PS-ID. In some other implementations, this address may be a multicast address and represent a type of STAs. In some other implementations, this address may represent a specific type of traffic, QoS and/or service as defined by a specification or proprietary information. In some cases, this address can also be provided by a user or an application.

In implementations where two STAs 106 are not paired, a standard may define one or more of the predefined values discussed above. These predefined values include, for example, which STAs support ULP mode, ULP duty cycle of peer STAs, and address of peer STAs. In some implementations, the above mentioned information and capabilities of a given STA may be a result of a previous discovery procedure.

Figure 8A:
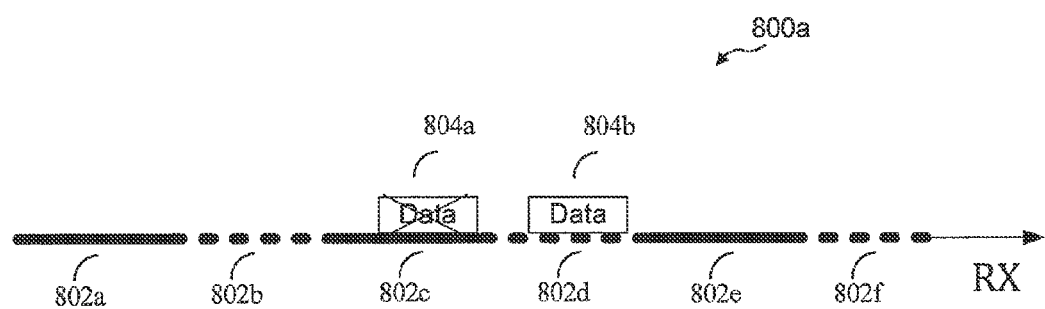
FIGS. 8A and 8B show additional exemplary signal transmissions for transmitting a low power wake-up signal, in accordance with an exemplary implementation of the invention.

FIG. 8A shows a group of exemplary signal receptions between STAs 106. For example, the STA 106a of FIG. 1 may send data to the STA 106b of FIG. 1. However, the STAs 106a and 106b are not associated with each other and/or are not synchronized with each other. In some implementations, the STA 106b is a ULP capable STA that cycles between an asleep state and a Wi-Fi ON state. In FIG. 8A, solid lines 802a, 802c, and 802e denote when the STA 106b is in the asleep state. Dotted lines 802b, 802d, and 802f denote when the STA 106b is in the Wi-Fi On state. The STA 106a does not know the timing of the Wi-Fi ON states 802b, 802d, and 802f for the STA 106b. Thus, a message 804a sent by the STA 106a to the STA 106b may be lost if the STA 106b is in the asleep state 802c. The STA 106a may repeatedly transmit the message 804a hoping that one of the transmissions will coincide with the Wi-Fi ON state 802d of the STA 106b. When the STA 106a sends the message 804b during the Wi-Fi ON state 802d of the STA 106b, the message 804b may be received by the STA 106b.

Figure 8B:
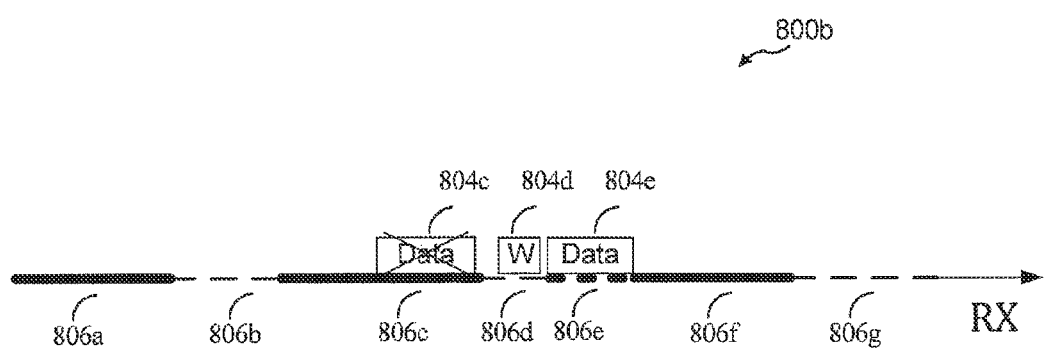

FIG. 8B shows another group of exemplary signal receptions between STAs 106 using a low power wake-up signal 804d. In contrast to the signal receptions in FIG. 8A, the receiving STA 106 cycles between an asleep state and a ULP ON state (or a ULP awake state). This may be preferred over the signal receptions described in connection with FIG. 8A because the STA 106 is in the ULP ON state which is a lower power state than the Wi-Fi ON state. However, because the STA 106b is in the ULP ON state, the STA 106b can receive the low power wake-up signal 804d. The frames are the same as FIG. 8A. In FIG. 8B, solid lines 806a, 806c, and 806f denote when the STA 106b is in the asleep state and dash lines 806b, 806d, and 806g denote when the STA 106b is in the ULP awake state. Because the STA 106a may not know the timing of the ULP awake states 806b, 806d and 806g for the STA 106b, if the STA 106a sends a message 804c to the STA 106b while the STA 106b is in an asleep state 806c, the message 804c will not be received. The STA 106a may repeatedly transmit the message 804c hoping that one of the transmissions will coincide with one of the ULP awake states 806b, 806d, or 806g of the STA 106b. However, when the STA 106a sends the wake-up message 804d to the STA 106b during the ULP awake state 806d for the STA 106b, the wake-up message 804d is received by the low power receiver 228 of the STA 106b. The received wake-up message 804d instructs the wireless device 202 to activate a second receiver, such as the receiver 212. Subsequently, the STA 106 may move to a Wi-Fi ON state 806e. Now, when the STA 106a sends a message 804e to the STA 106b, the STA 106b may be able to receive the message 804e. In some implementations, the message 804c or 804e may be a ULP message or a paging message.

FIG. 9 shows another group of exemplary signal transmissions for transmitting and receiving a low power wake-up signal, in accordance with an exemplary implementation of the invention. In FIG. 9, the STA 106 repeatedly transmits paging and/or wake-up messages in a specific sequence called a wake-up sequence 902. The wake-up sequence 902 is repeated as wake-up sequences 902a, 902b, and 902c. Each of the wake-up sequences 902a, 902b, and 902c may be different depending on a protocol or a signal that is used by the STA 106. At the same time, the STA 106 may cycle between a sleep state and an awake state (or a ULP awake state) with a given duty cycle. One example of this state cycling is shown in FIGS. 8A and 8B.

As shown in FIG. 9, the wake-up sequence 902c is sent to the STA 106 when the STA 106 is in the ULP awake state 904. During the ULP awake state 904, the low power receiver 228 of the STA 106 is activated. The STA 106 can receive the wake-up sequence 902c until an end 906 of the ULP awake state 904. After successfully receiving the wake-up sequence 902c, the STA 106 wakes up the receiver 212. The receiver 212 then sends an acknowledgment (ACK) message 908 that confirms the STA 106 is woken up and ready to receive data.

In some implementations, in order to ensure that the STA 106 successfully receive at least one wake-up message within the wake-up sequence 902, the low power receiver 228 of the STA 106 is in the awake state or the ULP awake state for a reception period that exceeds the duration of a single wake-up sequence 902. For example, the reception period can be longer than a single wake-up sequence 902a, 902b, or 902c.

In this way, the STA 106 is woken during a first wake-up sequence 902b and is awake during a second wake-up sequence 902c. In some implementations, each wake-up sequence 902a, 902b, 902c includes only one wake-up signal or one wake-up message. In such an implementation, the STA 106 receives the wake-up signal during the wake-up sequence 902c.

In some implementations, if the sending STA 106 does not know if the receiving STA 106 received the wake-up sequence 902 and entered an awake state, the sending STA 106 can send a short frame to the receiving STA 106 requesting confirmation that the receiving STA is in the awake state. The short frame can be sent as part of the wake-up sequence 902.

In some cases, after a contention occurs, the receiving STA 106 sends a power-save poll message, e.g., as in a legacy PS mode. In some implementations, the receiving STA 106 sends the power-save poll message requesting that the sending STA 106 release an amount of traffic data. In some other implementations, the receiving STA 106 responds immediately to the sending STA 106 that it is awake.

In some implementations, the sending STA 106 sends a unicast message if the STA 106 knows a station identifier, such as an address, of the receiving STA 106. In some implementations, the sending STA 106 includes a broadcast wake-up address in the wake-up message. In some cases, the receiving STA 106 sends a unicast confirmation packet. When the receiving STA 106 does not receive the wake-up message, it may go to sleep. In some implementations, because of false alarms existing during receiving a wake-up message, a group of STAs may be woken up even though only one of the group of STAs may have data. In some implementations, when the sending STA 106 does not know the address of the receiving STA 106, the sending STA 106 sends a broadcast or multicast wake-up message. In this case, a group of STAs may be woken up.

In some implementations, the wake-up message includes a station identifier. The station identifier is a bit map that includes a plurality of bits. Each bit of the bit map corresponds to a station. In some implementations, each bit of the bit map indicates the status of each station.

In some implementations, the wake-up message includes a device class identifier. The device class identifier indicates which class of devices is intended to be woken up.

In some other implementation, the wake-up message includes a message type identifier. The message type identifier indicates a type of the wake-up message, such as a priority or a purpose of the wake-up message.

In some implementations, the STA sends a unicast message addressed to the receiving STA. In some implementations, the unicast message is an ACK frame which includes a physical layer preamble and data. In some implementations, the unicast message is a CTS message that includes a physical layer preamble.

In some implementations, the wake-up message or the wake-up sequence 902 may include a sequence number. The sequence number identifies one of the wake-up messages or wake-up sequences 902 in a series of wake-up messages or wake-up sequences. In some implementations, the sequence number indicates the number of wake-up sequences still to be sent. In some implementation, a set of sequence numbers may be reverse-ordered.

After receiving and determining the sequence number, the STA 106 is able to determine when the wake-up sequence will end so the STA 106 can send an ACK. In some implementations, after the receiving STA 106 determines the end of a plurality of wake-up sequences sent by the sending STA 106, the STA 106 sends the ACK to confirm its successful reception of at least one wake-up sequence 902 or wake-up message.

Figure 10:
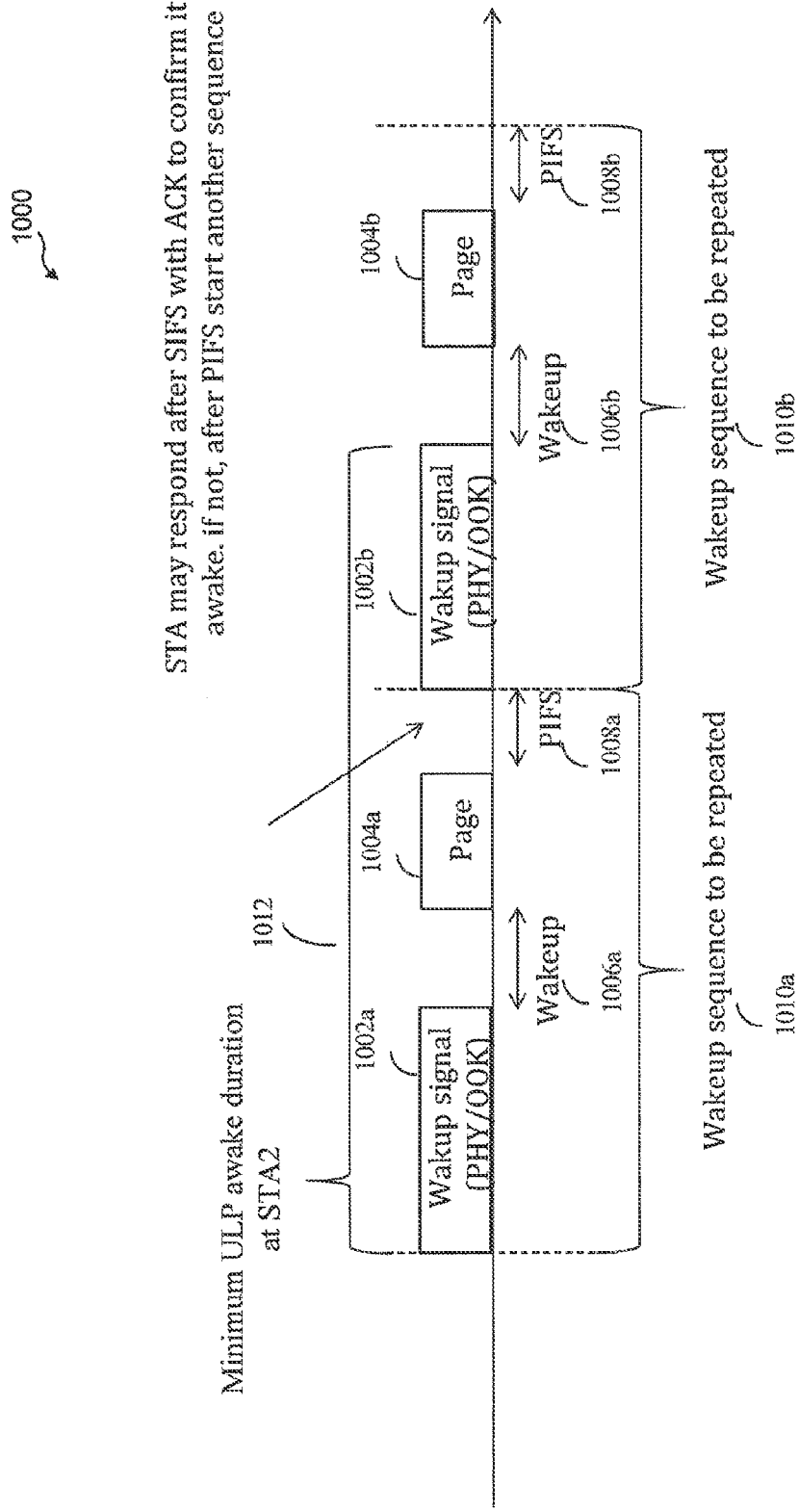
FIG. 10 shows additional exemplary signal transmissions for transmitting a low power wake-up signal, in accordance with an exemplary implementation of the invention.

FIG. 10 shows another group of exemplary signal transmissions for transmitting a low power wake-up signal, in accordance with an exemplary implementation of the invention. As show in FIG. 10, the STA 106a of FIG. 1 is transmitting a wake-up sequence repeatedly as sequences 1010a and 1010b. Each of the sequences 1010a and 1010b includes a wake-up signal 1002 and a page 1004. As shown in FIG. 10, the sequence 1010a includes wake-up signal 1002a and page 1004a. The sequence 1010b includes wake-up signal 1002b and page 1004b. The page 1004 can be sent with higher transmission power and thus is more likely to be received by an STA than the wake-up signal 1002.

In some implementations, between the wake-up signal 1002 and the subsequent page 1004, there is a wake-up period 1006. As shown in FIG. 10, wake-up periods 1006a and 1006b are between the wake-up signal 1002a and the page 1004a and between the wake-up signal 1002b and the page 1004b, respectively. In some implementations, the wake-up sequence 1010 includes a Point coordinate function Inter-Frame Spacing (PIFS). For example, the PIFS 1008a is between the page 1004a and the wake-up signal 1002b.

An STA may take one wake-up period of a STA into account before sending a paging message. For example, when an IEEE 802.11 receiver is used, a STA may have already woken up its clock so that the STA can then take less time to wake-up the rest of its circuit. In some implementations, when a STA wants to successfully receive a wake-up signal, the STA stays awake during a minimum ULP-awake duration 1012. As shown in FIG. 10, the minimum ULP-awake duration 1012 includes the period of the wake-up sequence 1010a plus a transmission period of the wake-up signal 1002b.

In some implementations, after the STA 106 successfully receives the wake-up signal and page, the STA 106 responds after a short inter-frame spacing (SIFS) with an ACK or a short ACK to confirm that it is awake. Otherwise, after a PIFS, the STA may start another wake-up sequence 1010. In some implementations, the wake-up signal is a physical layer preamble or an On-Off key (OOK) modulated sequence. This OOK modulated sequence may be preceded by a physical layer preamble. In some implementations, the page facilitates reducing false positives.

In some other implementations, the STA does not send a confirmation frame but expects the STA to send a trigger frame, such as a PS-Poll as defined in a legacy power-save mode. One potential issue is there are false positives when multiple STAs wake-up and send PS-Poll or trigger frames. Another potential issue is when the STA 106 broadcasts a power-save identifier. In some other implementations, the STA may repeat a transmission of the wake-up signal 1002 and page 1004 in a long sequence to try to catch a ULP awake period of at least one STA.

In some implementations, once the STA indicates that it is awake, the sending STA sends data to the STA. The woken STA returns to a doze state as in existing power-save mechanisms when a More Data field in a Frame Control indicates there is no more data or when an EOSP (end of service period) field in a Frame Control indicates an end of service period.

Figure 11:
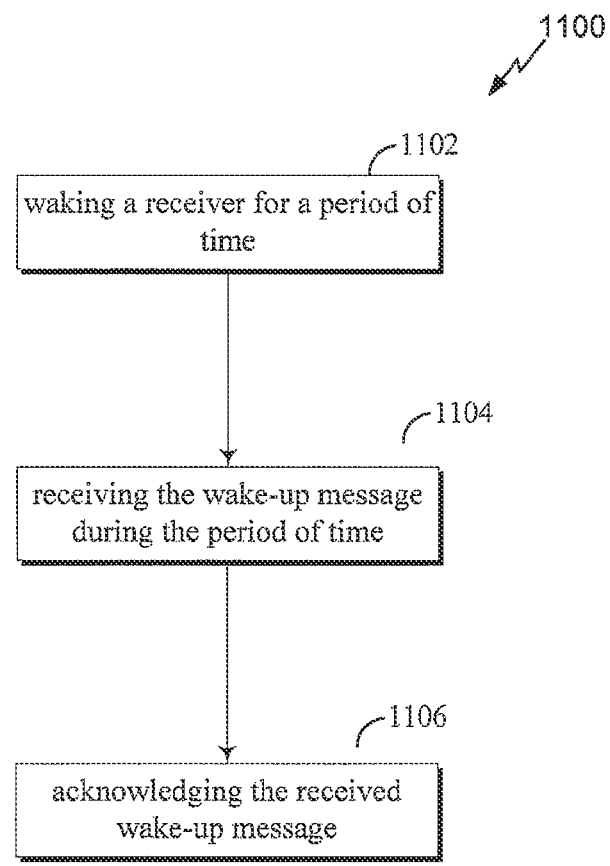
FIG. 11 is a flowchart of an exemplary method of wireless communication, in accordance with an exemplary implementation of the invention.

FIG. 11 is a flowchart of an exemplary method 1100 of wireless communication for waking a low power receiver 228. The method may be performed by STA 106. At block 1102, the receiver 228 is woken for a period of time. The means for generating a plurality of wake-up sequences may comprise at least one of a wake-up circuit 230, a low power receiver 228, or a processor 204. The STA 106 may include the wake-up circuit 230 with the low power receiver 228. The low power receiver 228 may be woken up and configured to receive and detect the wake-up signal. At block 1104, the transceiver 214 is woken up by the low power receiver 228 during the period of time. The means for transmitting the generated wake-up sequence may comprise one of a processing system. The processor 204 may configure the transceiver 214 for receiving the wake-up signal. After block 1104, the transceiver 214 is configured to acknowledge the received wake-up message. For example, the processor 204 may configure the transceiver 214 to acknowledge the received wake-up signal. In one implementation, the STA 106 is configured to transmit and receive communications via the transceiver 212 according to a standard such as 802.11.

Figure 12:
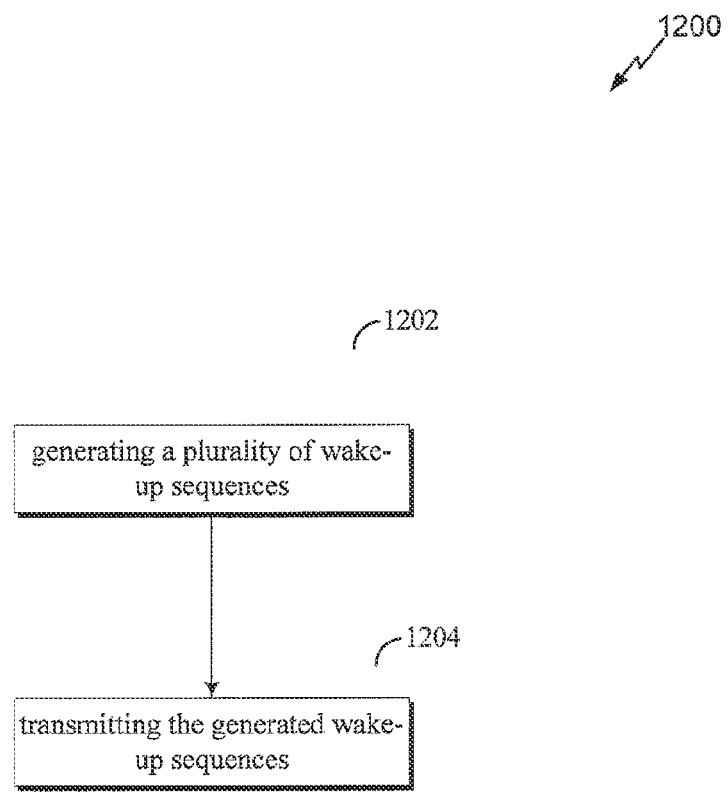
FIG. 12 is a flowchart of another exemplary method of wireless communication, in accordance with an exemplary implementation of the invention.

FIG. 12 is a flowchart of another exemplary method 1200 of wireless communication for activating the low power receiver 228. The method may be performed by a STA 106 or an AP 104. At block 1202, a plurality of wake-up sequences are generated. The means for generating the plurality of wake-up sequences may comprise at least one of a processor 204 or a processor system. The plurality of wake-up sequences is generated to wake an STA for receiving data. For example, the STA 106 with an asleep transceiver may receive and decode data after receiving the wake-up signal. In some implementations, the plurality of wake-up sequences comprises at least one 802.11 OFDM PHY preamble.

The STA 106 may not be capable of decoding at least one wake-up sequence. In one implementation the STA 106 or AP 104 transmits the plurality of wake-up sequences. At block 1204, the generated wake-up sequences are transmitted to a wireless node. The means for transmitting the generated wake-up sequences may comprise at least one of a transmitter 210 or a transceiver 214. The wireless node may be any STA 106. For example, the STA 106 or AP 104 is configured to generate the plurality of wake-up sequences and thereafter transmit the wake-up sequences.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain implementations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some implementations computer readable medium may comprise non-transitory computer readable medium (e.g., tangible media). In addition, in some implementations computer readable medium may comprise transitory computer readable medium (e.g., a signal). Combinations of the above are also included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain implementations may comprise a computer program product for performing the operations presented herein. For example, such a computer program product may comprise a computer readable medium having instructions stored (and/or encoded) thereon, the instructions being executable by one or more processors to perform the operations described herein. For certain implementations, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to implementations of the present disclosure, other and further implementations of the disclosure may be devised without departing from the basic scope thereof, and the scope thereof is determined by the claims that follow.

What is claimed is:

1. An apparatus for wireless communications, comprising:
a first receiver;
a processing system configured to activate the first receiver for a period of time exceeding or equaling at least a transmission period of a wake-up sequence, wherein the wake-up sequence comprises a wake-up message and the transmission period of the wake-up sequence comprises a wake-up message transmission period, and wherein the first receiver is configured to receive the wake-up message during the period of time and to provide, in response, a signal to operate a second receiver in the apparatus; and
a transmitter configured to transmit a message acknowledging receipt of the wake-up message.

2. The apparatus of claim 1, wherein the processing system further comprises an activation circuit, the activation circuit being configured to activate the first receiver at a defined time, the defined time being at a start of the period of time.

3. The apparatus of claim 2, wherein the first receiver is configured to cycle between an awake state and a sleep state according to a duty cycle prior to receiving the wake-up message, and wherein the defined time corresponds to a beginning of the awake state.

4. The apparatus of claim 1, wherein the processing system is further configured to decode at least the wake-up message using at least one of an on-off keying modulation or a frequency-shift keying modulation, the processing system being further configured to activate the second receiver based at least in part on the decoded wake-up message.

5. The apparatus of claim 1, wherein the wake-up message is a paging message configured in a null data packet (NDP) format.

6. The apparatus of claim 1, wherein the wake-up message comprises a device class identifier, and wherein the processing system is further configured to determine whether the device class identifier matches a stored identifier.

7. The apparatus of claim 1, wherein the wake-up message comprises a message type identifier, and wherein the processing system is further configured to determine whether the message type identifier matches a stored message type identifier.

8. The apparatus of claim 1, wherein the processing system receives the wake-up message from a device that is not synchronized with the apparatus.

9. The apparatus of claim 1, wherein the processing system receives the wake-up message from a device that is not associated with the apparatus.

10. The apparatus of claim 1, wherein the wake-up message comprises a station identifier, and wherein the processing system is further configured to determine whether the station identifier matches a stored identifier.

11. The apparatus of claim 10, wherein the station identifier comprises a plurality of bits, one of the plurality of bits identifying the apparatus.

12. The apparatus of claim 1, wherein the first receiver is configured to receive the wake-up sequence during the period of time, and wherein in response to receiving the wake-up sequence, the processing system is further configured to determine whether a confirmation identifier in the wake-up sequence matches both a station identifier in the wake-up message and an identifier stored in the apparatus.

13. The apparatus of claim 12, wherein each of the station identifier in the wake-up message and the confirmation identifier indicates that information is to be transmitted to the apparatus.

14. The apparatus of claim 12, wherein the confirmation identifier is received subsequent to the wake-up message in the wake-up sequence.

15. The apparatus of claim 1, wherein:
the wake-up message identifies a sequence number in a plurality of wake-up sequences, the plurality of wake-up sequences comprising the wake-up sequence,
the processing system is further configured to determine an end of a transmission of the plurality of wake-up sequences based on the identified sequence number, and
the transmitter is configured to transmit the message acknowledging receipt of the wake-up message at the end of the transmission.

16. The apparatus of claim 15, wherein the sequence number indicates a number of the plurality of wake-up sequences to be sent after the wake-up message.

17. The apparatus of claim 15, wherein the sequence number is a reverse-ordered number, the reverse-ordered number indicating a number of the plurality of wake-up sequences to be sent after the wake-up message.

18. The apparatus of claim 1, wherein the processing system is further configured to activate the second receiver based on the wake-up message.

19. The apparatus of claim 18, wherein the second receiver consumes more power when activated than the first receiver consumes when activated.

20. A method of wireless communication, comprising:
activating a first receiver in an apparatus for a period of time, the period of time exceeding or equaling at least a transmission period of a wake-up sequence that includes a wake-up message plus a wake-up message transmission period, wherein the first receiver is configured to receive the wake-up message during the period of time;
providing, in response to the receipt of the wake-up message, a signal to operate a second receiver in the apparatus using the first receiver; and
transmitting a message acknowledging receipt of the wake-up message.

21. The method of claim 20 further comprising activating the first receiver at a defined time, the defined time being at a start of the period of time.

22. The method of claim 21, further comprising cycling the first receiver between an awake state and a sleep state according to a duty cycle prior to receiving the wake-up message, and wherein the defined time corresponds to a beginning of the awake state.

23. The method of claim 20 further comprising:
decoding at least the wake-up message using at least one of an on-off keying modulation or a frequency-shift keying modulation; and
activating the second receiver based at least in part on the decoded wake-up message.

24. The method of claim 20, wherein the wake-up message is a paging message configured in a null data packet (NDP) format.

25. The method of claim 20, wherein the wake-up message comprises a station identifier, the method further comprising determining whether the station identifier matches a stored identifier.

26. The method of claim 25, wherein the station identifier comprises a plurality of bits, one of the plurality of bits identifying a station.

27. The method of claim 20, wherein the wake-up message comprises a device class identifier, the method further comprising determining whether the device class identifier matches a stored identifier.

28. The method of claim 20, wherein the wake-up message comprises a message type identifier, the method further comprising determining whether the message type identifier matches a stored message type identifier.

29. The method of claim 20, wherein the wake-up sequence comprises a confirmation identifier; and wherein the method further comprises receiving the wake-up sequence during the period of time; and determining whether the confirmation identifier in the wake-up sequence matches both a station identifier in the wake-up message and an identifier stored in a station.

30. The method of claim 29, wherein each of the station identifier in the wake-up message and the confirmation identifier indicates that information is to be transmitted to the apparatus.

31. The method of claim 29, wherein the confirmation identifier is received subsequent to the wake-up message in the wake-up sequence.

32. The method of claim 20, wherein the wake-up message identifies a sequence number in a plurality of wake-up sequences, the plurality of wake-up sequences comprising the wake-up sequence, the method further comprising:
determining an end of a transmission of the plurality of wake-up sequences based on the identified sequence number, and
transmitting the message acknowledging receipt of the wake-up message at the end of the transmission.

33. The method of claim 32, wherein the sequence number indicates a number of the plurality of wake-up sequences to be sent after the wake-up message.

34. The method of claim 32, wherein the sequence number is a reverse-ordered number, the reverse-ordered number indicating a number of the plurality of wake-up sequences to be sent after the wake-up message.

35. The method of claim 20 further comprising activating the second receiver based on the wake-up message.

36. The method of claim 35, wherein the second receiver consumes more power when activated than the first receiver consumes when activated.

37. The method of claim 20, further comprising receiving the wake-up message from a device that is not synchronized with the first receiver.

38. The method of claim 20, further comprising receiving the wake-up from a device that is not associated with the first receiver.

39. An apparatus for wireless communications, comprising:
    means for activating a first receiver for a period of time, the period of time exceeding or equaling at least a transmission period of a wake-up sequence that includes a wake-up message plus a wake-up message transmission period, wherein the first receiver is configured to receive the wake-up message during the period of time;
    means for providing, in response to the receipt of the wake-up message, a signal to operate a second receiver in the apparatus using the first receiver; and
    means for transmitting a message acknowledging receipt of the wake-up message.

40. The apparatus of claim 39, wherein the means for activating the first receiver activates the first receiver at a defined time, the defined time being at a start of the period of time.

41. The apparatus of claim 40, wherein the means for activating is further configured to cycle the first receiver between an awake state and a sleep state according to a duty cycle prior to receiving the wake-up message, and wherein the defined time corresponds to a beginning of the awake state.

42. The apparatus of claim 39 further comprising means for decoding at least the wake-up message using at least one of an on-off keying modulation or a frequency-shift keying modulation, wherein the means for activating is further configured to activate a second receiver based at least in part on the decoded wake-up message.

43. The apparatus of claim 39, wherein the wake-up message is a paging message configured in a null data packet (NDP) format.

44. The apparatus of claim 39, wherein the wake-up message comprises a station identifier, the apparatus further comprising means for determining whether the station identifier matches a stored identifier.

45. The apparatus of claim 44, wherein the station identifier comprises a plurality of bits, one of the plurality of bits identifying a station.

46. The apparatus of claim 39, wherein the wake-up message comprises a device class identifier, the apparatus further comprising means for determining whether the device class identifier matches a stored identifier.

47. The apparatus of claim 39, wherein the wake-up message comprises a message type identifier, the apparatus further comprising means for determining whether the message type identifier matches a stored message type identifier.

48. The apparatus of claim 39, wherein the wake-up sequence comprises a confirmation identifier, and wherein the apparatus further comprises means for receiving the wake-up sequence during the period of time; and means for determining whether the confirmation identifier in the wake-up sequence matches both a station identifier in the wake-up message and an identifier stored in a station.

49. The apparatus of claim 48, wherein each of the station identifier in the wake-up message and the confirmation identifier indicates that information is to be transmitted to the apparatus.

50. The apparatus of claim 49 wherein the confirmation identifier is received subsequent to the wake-up message in the wake-up sequence.

51. The apparatus of claim 39, wherein the wake-up message identifies a sequence number in a plurality of wake-up sequences, the plurality of wake-up sequences comprising the wake-up sequence, the apparatus further comprising:
    means for determining an end of a transmission of the plurality of wake-up sequences based on the identified sequence number, and
    means for transmitting the message acknowledging receipt of the wake-up message at the end of the transmission.

52. The apparatus of claim 51, wherein the sequence number indicates a number of the plurality of wake-up sequences to be sent after the wake-up message.

53. The apparatus of claim 51, wherein the sequence number is a reverse-ordered number, the reverse-ordered number indicating a number of the plurality of wake-up sequences to be sent after the wake-up message.

54. The apparatus of claim 39 further comprising means for activating a second receiver based on the wake-up message.

55. The apparatus of claim 54, wherein the second receiver consumes more power when activated than the first receiver consumes when activated.

56. The apparatus of claim 39, further comprising means for receiving the wake-up message from a device that is not synchronized with the first receiver.

57. The apparatus of claim 39, further comprising means for receiving the wake-up from a device that is not associated with the first receiver.

58. A non-transitory computer readable storage medium with instructions encoded thereon that when executed cause an apparatus to perform a method comprising:
    activating a first receiver for a period of time, the period of time exceeding or equaling at least a transmission period of a wake-up sequence that includes a wake-up message plus a wake-up message transmission period, wherein the first receiver is configured to receive the wake-up message during the period of time;
    providing, in response to the receipt of the wake-up message, a signal to operate a second receiver in the apparatus using the first receiver; and
    transmitting a message acknowledging receipt of the wake-up message.

59. A mobile station, comprising:
    at least one antenna;
    a first receiver;
    a processing system configured to activate the first receiver for a period of time, the period of time exceeding or equaling at least a transmission period of a wake-up sequence that includes a wake-up message plus a wake-up message transmission period, wherein the first receiver is configured to receive, via the at least one antenna, the wake-up message during the period of time;
    providing, in response to the receipt of the wake-up message, a signal to operate a second receiver in the apparatus; and
    a transmitter configured to transmit, via the at least one antenna, a message acknowledging receipt of the wake-up message.

* * * * *